(12) United States Patent
Kalis et al.

(10) Patent No.: US 12,411,268 B2
(45) Date of Patent: Sep. 9, 2025

(54) DEVICE FOR HOMOGENIZING LASER LIGHT AND ARRANGEMENT OF A PLURALITY OF SUCH DEVICES

(71) Applicant: LIMO DISPLAY GMBH, Dortmund (DE)

(72) Inventors: Henning Kalis, Dortmund (DE); Florian Seck, Unna (DE); Mikhail Ivanenko, Essen (DE)

(73) Assignee: LIMO DISPLAY GMBH, Dortmund (DE)

( * ) Notice: Subject to any disclaimer, the term of this patent is extended or adjusted under 35 U.S.C. 154(b) by 112 days.

(21) Appl. No.: 17/760,590

(22) PCT Filed: Feb. 23, 2021

(86) PCT No.: PCT/EP2021/054444
§ 371 (c)(1),
(2) Date: Mar. 15, 2022

(87) PCT Pub. No.: WO2021/239278
PCT Pub. Date: Dec. 2, 2021

(65) Prior Publication Data
US 2024/0069252 A1    Feb. 29, 2024

(30) Foreign Application Priority Data
May 26, 2020   (DE) ............... 10 2020 114 077.0

(51) Int. Cl.
*B23K 26/06* (2014.01)
*B23K 26/073* (2006.01)
(Continued)

(52) U.S. Cl.
CPC ........ *G02B 3/0062* (2013.01); *B23K 26/0648* (2013.01); *B23K 26/073* (2013.01); *G02B 27/0961* (2013.01)

(58) Field of Classification Search
CPC .............. G02B 3/0062; G02B 27/0961; G02B 3/0043; G02B 3/005; B23K 26/0648; B23K 26/073
See application file for complete search history.

(56) References Cited

U.S. PATENT DOCUMENTS

| 7,090,353 | B1 * | 8/2006 | Bay ........................ | G03B 33/06 353/31 |
| 7,145,639 | B2 * | 12/2006 | Ishikawa ................ | G03B 27/54 355/53 |

(Continued)

*Primary Examiner* — Bumsuk Won
*Assistant Examiner* — John Curtis Sipes
(74) *Attorney, Agent, or Firm* — IPro, PLLC (57) ABSTRACT

The invention relates to a device (1.1-1.*m*) for homogenizing laser light (2.1-2.*m*), comprising a first microlens array (3) comprising a plurality of microlenses (30.1-30.*n*) arranged side by side in a first direction and a second microlens array (4) comprising a plurality of microlenses (40.1-40.*n*) arranged side by side in the first direction; wherein the second microlens array (4) is arranged in the beam propagation direction of the laser light (2.1-2.*m*) from the first microlens array (3) and the plane (41) of the lens vertices of the second microlens array (4) is inclined at an angle |α| to the plane (31) of the lens vertices of the first microlens array (3), and wherein the microlens arrays (3, 4) are formed such that the focal lengths of the microlenses (30.1-30.*n*, 40.1-40.*n*) arranged side by side in the first direction change starting from the first microlens (30.1, 40.1) up to the nth microlens (30*n*, 40*n*), wherein an optical wedge (5) is arranged behind the second microlens array (4) in the beam propagation direction and the focal lengths of the microlenses (30.1-30.*n*, 40.1-40.*n*) of the microlens arrays (3, 4) are selected such that a focal plane (6) of the device (1.1-1.*m*) lies in an air gap (7) between the second microlens array (4) and the optical wedge (5).

11 Claims, 6 Drawing Sheets

(51) Int. Cl.
*G02B 3/00* (2006.01)
*G02B 27/09* (2006.01)

(56) References Cited

U.S. PATENT DOCUMENTS

| | | | | |
|---|---|---|---|---|
| 9,563,062 | B2* | 2/2017 | Muller | G02B 30/27 |
| 9,851,571 | B1* | 12/2017 | Zhang | G02B 27/0966 |
| 11,022,872 | B2* | 6/2021 | Huang | G03B 21/2066 |
| 2007/0171646 | A1* | 7/2007 | Kojima | H04N 9/3117 |
| | | | | 362/268 |
| 2007/0258077 | A1* | 11/2007 | Tanaka | G03F 7/70108 |
| | | | | 355/71 |
| 2008/0084612 | A1* | 4/2008 | Bayer | G02B 19/0014 |
| | | | | 359/623 |
| 2010/0033829 | A1* | 2/2010 | Wippermann | G02B 27/01 |
| | | | | 359/623 |
| 2013/0222875 | A1* | 8/2013 | Chifu | G03B 21/2033 |
| | | | | 359/201.1 |
| 2013/0279012 | A1* | 10/2013 | Lee | G09F 13/04 |
| | | | | 359/622 |

* cited by examiner

DEVICE FOR HOMOGENIZING LASER LIGHT AND ARRANGEMENT OF A PLURALITY OF SUCH DEVICES

TECHNICAL FIELD

The present invention relates to a device for homogenizing laser light, comprising a first microlens array having a plurality of microlenses arranged side by side in a first direction, a second microlens array having a plurality of microlenses arranged side by side in the first direction, wherein the second microlens array is arranged spaced apart from the first microlens array in the beam propagation direction of the laser light, and the plane of the lens vertices of the second microlens array is inclined to the plane of the lens vertices of the first microlens array by an angle $|\alpha|$, and wherein the microlens arrays are formed such that the focal lengths of the microlenses arranged side by side in the first direction vary starting from the first microlens to the nth microlens. Furthermore, the present invention relates to an arrangement of a plurality of such devices for homogenizing laser light.

BACKGROUND

From WO 2008/043491 A1 a device for homogenization of laser light is known, which has a monolithic structure. The device has two spaced-apart microlens arrays, the plane of the lens vertices of the second microlens array being inclined at an angle $\alpha$ with respect to the plane of the lens vertices of the first microlens array. The microlenses of the two microlens arrays are ordered by their diameters and focal lengths, respectively. Starting from a first microlens of the first microlens array and a first microlens of the second microlens array whose distance is the shortest distance between all microlenses of the two microlens arrays assigned to each other, the diameters and focal lengths, respectively, increase in a first direction in which the microlenses are arranged side by side. This means that the last microlens of the first microlens array and the last microlens of the second microlens array have the largest diameter or focal length and the largest distance from each other.

A disadvantage of this device for homogenization of laser light is that the focal points of the microlenses of the first microlens array are located on the surface of the microlenses of the second microlens array or in the glass substrate of the second microlens array. This leads to the fact that depending on the operating parameters of the laser light source, in particular depending on the intensity, the illumination of the second microlens array and the beam divergence, energy densities of the laser light can occur very quickly, which can lead to a destruction threshold of a coating of the microlenses of the second microlens array or a destruction threshold of the glass substrate of the second microlens array being reached. This can lead to irreversible destruction of the second microlens array when high-energy laser radiation is used, such as is used in material processing, in particular for crystallization of silicon.

Furthermore, in the prior art device for homogenization of laser light, there is the problem that as the size of the microlenses increases along the array, a varying sampling of the beam occurs. This results in an undesirable, essentially linear increase or decrease in the intensity profile along the resulting intensity distribution in the first (homogenization) direction in the working plane. Such macro-inhomogeneity causes the workpiece to be machined unevenly, which should be avoided at all costs.

Moreover, the monolithic structure of the device for homogenizing laser light known from WO 2008/043491 A1 does not permit subsequent adjustment, in particular adjustment of the distance between the first and second microlens array for fine adjustment of the length of the homogenized field in the working plane.

SUMMARY

The task of the present invention is to provide a device for homogenization of laser light of the kind mentioned at the beginning and an arrangement of a plurality of such devices, which during operation in a laser device can lead to a lower energy density in and on the optical components and can effectively reduce micro- and macro-inhomogeneities of the light field in the working plane, respectively.

The solution of this task is provided by a device for homogenization of laser light of the kind mentioned at the beginning with the features of the characterizing part of claim 1. With regard to the arrangement, this task is solved by an arrangement with the features of claim 10. The subclaims are related to further advantageous embodiments of the invention.

A device according to the invention for homogenizing laser light is characterized in that an optical wedge is arranged behind the second microlens array in the beam propagation direction, and the focal lengths of the microlenses of the microlens arrays are selected such that a focal plane of the device lies in an air gap between the second microlens array and the optical wedge. The first and second microlens arrays of the non-monolithic laser light homogenization device according to the invention have radii of curvature, diameters, and focal lengths, respectively, that change in the first direction so that interference-induced micro-inhomogeneities can be effectively suppressed. Because the focal plane of the device is located in an air gap behind the second microlens array and in front of the optical wedge in the beam propagation direction of the laser light, the device for homogenizing laser light presented here is also suitable for applications in which very high laser powers, in particular very high pulse energies, occur. This is because high energy input into the optical components of the device, in particular into the glass substrate of the second microlens array or a coating of the second microlens array, can be effectively prevented. Since the focal plane is located within the air gap between the second microlens array and the optical wedge, excessive energy input into the optical wedge can also be effectively prevented. Moreover, due to the non-monolithic design of the device, the first microlens array and the second microlens array are two physically separate components. This makes it advantageously possible to compensate for decentration errors of the microlens arrays with respect to each other and also to change the distance between the microlens arrays. By changing the distance the size of the homogenized light field in a working plane can be varied to a certain extent.

In an advantageous embodiment, the microlens arrays are designed in such a way that the focal lengths of the microlenses arranged next to each other in the first direction increase successively starting from the first microlens up to the nth microlens. Such an embodiment enables in particular a simpler fabrication of the microlens arrays.

In a preferred embodiment, it is proposed that the number of microlenses of the first microlens array corresponds to the number of microlenses of the second microlens array, so that each of the microlenses of the second microlens array is associated with a microlens of the first microlens array. It follows from this that, during operation of the device, those partial beams of the laser light which have passed through an i-th microlens (i=1 . . . n) of the first microlens array also pass, at least for the most part, through an i-th microlens (i=1 . . . n) of the second microlens array.

In a particularly preferred embodiment, it is proposed that the microlenses are formed as cylindrical lenses whose cylindrical axes are each oriented in a second direction perpendicular to the first direction and perpendicular to a third direction defining the beam propagation direction of the laser light. The cylindrical axes of the cylindrical lenses are thus oriented in particular parallel to each other. For example, azylindrical microlenses (for example for the second microlens array) or spherical microlenses can also be used, whereby the complexity of the overall optical design increases even further, particularly in the case of a spherical design. The use of cylindrical lenses is thus more advantageous in practical applications.

In a preferred embodiment, it may be provided that the optical wedge has a light entrance surface oriented parallel to the plane of the lens vertices of the second microlens array. As a result, the light entrance surface of the optical wedge is also inclined to the plane of the lens vertices of the first microlens array by an angle $|\alpha|$. This leads to the fact that the angular offset caused by the second microlens array is compensated by the optical wedge and only a resulting parallel offset is generated.

The well-defined common focal plane within the air gap between the second microlens array and the optical wedge, which is arranged at a distance dL behind the second microlens array, can be achieved in particular by adjusting the radii of curvature or focal lengths of the microlenses of the first microlens array. Preferably, the focal length $f_1^{(i)}$ of the i-th microlens of the first microlens array is:

$$f_1^{(i)} = -\frac{(f^{(i)})^2}{\frac{d_G}{n_G} + d_L - f^{(i)}}$$

where $d_G$ denotes the glass thickness and $n_G$ the refractive index of the glass substrate of the second microlens array and where $f^{(i)}$ denotes the focal length of the i-th microlens of the second microlens array and where dL is the distance between the second microlens array and the optical wedge and where: i=1 . . . n. With this formula, all focal lengths of the total n microlenses of the first microlens array can be calculated very easily based on optical properties of the total n microlenses of the second microlens array. The denominator typically has a negative sign, so that the focal lengths $f_1^{(i)}$ of all microlenses of the first microlens array have a positive sign and these microlenses are thus convex in shape, preferably $$\frac{d_G}{n_G} + d_L < f^{(i)}$$

In a preferred embodiment, it is proposed that for the distances $d_{12}^{(i+1)}$ between the microlenses of the first microlens array and the microlenses of the second microlens array:

$$d_{12}^{(i+1)} = \frac{2\left(f^{(i)} + \frac{p^{(i)}}{2}\tan(\alpha)\right)}{\beta\left(\frac{2f^{(i)}}{p^{(i)}} - \tan(\alpha)\right)}$$

where $p^{(i)}$ denotes the center-to-center distance between the i-th microlens and the i+1-th microlens, $f^{(i)}$ denotes the focal length of the i-th microlens of the second microlens array, and B denotes the numerical aperture of the second microlens array, i=1 . . . n−1. The distances $d_{12}^{(i+1)}$, which are typically in the micrometer or millimeter range, are thus determined by a recursive formula and depend in particular on optical properties (focal point and numerical aperture) and geometrical properties (center-to-center distance) of the microlenses of the second microlens array.

In an advantageous embodiment, it is proposed that the tilt angle $\alpha$ is chosen such that $$\frac{\beta}{2} < \arcsin\left[n_G \sin\left\{\alpha - \arcsin\left(\sin\frac{[\alpha]}{n_G}\right)\right\}\right]$$

where $\beta$ denotes the numerical aperture and $n_G$ the refractive index of the second microlens array. Preferably, $|\alpha|$ should be <15°, since imaging errors may occur at larger angles, which would have to be suitably compensated by additional measures.

In an advantageous embodiment, it is possible that the optical wedge is designed to be translationally movable in the first direction and/or rotatable about an axis extending in the second direction. In this way, the optical wedge makes possible a fine dynamic adjustment of the optical path of the laser light, in particular by the rotation and/or translation, for example during processing of a workpiece with a laser device which has at least one device for homogenizing laser light presented here. In particular, this creates the possibility of influencing in real time the resulting surface quality of the workpiece to be processed.

It should be noted at this point that it is also possible to use corresponding micromirror arrays in combination with a refractive optical wedge instead of microlens arrays.

An arrangement according to the invention comprises a plurality of devices for homogenizing laser light according to any one of claims 1 to 9, wherein the devices are arranged adjacent to each other in the first direction and devices adjacent to each other are oriented such that the plane of the lens vertexes of the second microlens array is inclined to the plane of the lens vertexes of the first microlens array alternately by an angle +$\alpha$ and by an angle −$\alpha$.

In a preferred embodiment, it is proposed that an even number of devices are arranged side by side. An arrangement of an even number of devices for homogenization of laser light carried out in this manner leads, for example in a laser device capable of generating a line intensity distribution in a working plane, to a superposition of an even number of line intensity profiles of the laser light in the working plane, which have the same slope of the intensity variation along the line but with different signs. In this way, the macro inhomogeneities of the line-shaped focus can be compensated in an especially advantageous manner.

To avoid the inhomogeneity due to above mentioned sampling effect alternatively a prehomogenizing of the laser light incident at the first microlens array can be used. Then, for example, only one device or an odd number of devices could be used to homogenize the laser light.

Furthermore, it is possible that suppression of the macro-inhomogeneity in the working plane can also be achieved by an asymmetric adaptation of, for example of an initially Gaussian light beam profile (in particular corresponding to a Weibull distribution). For this purpose, the asymmetry of the beam profile must be adapted to the width modulation of the microlenses of the microlens arrays that accompanies the tilt angle.

BRIEF DESCRIPTION OF FIGURES

Further features and advantages of the present invention will become apparent from the following description of preferred embodiments with reference to the accompanying figures. Therein show.

DETAILED DESCRIPTION

For clarity, a Cartesian coordinate system has been drawn in each of the figures. y-axis is perpendicular to the drawing plane in each case.

Before details of the devices 1.1-1.$m$ for homogenizing laser light 2.1-2.$m$ and an arrangement 103 formed therefrom of a number m≥2 of such devices 1.1-1.$m$ are to be described in more detail, some basic principles are first explained below with reference to FIG. 1, in which way a homogeneous, for example line-shaped intensity distribution of the laser light 2.1-2.$m$ can be generated in a working plane 105 by means of a laser device 100 equipped with the arrangement 103.

Figure 1:
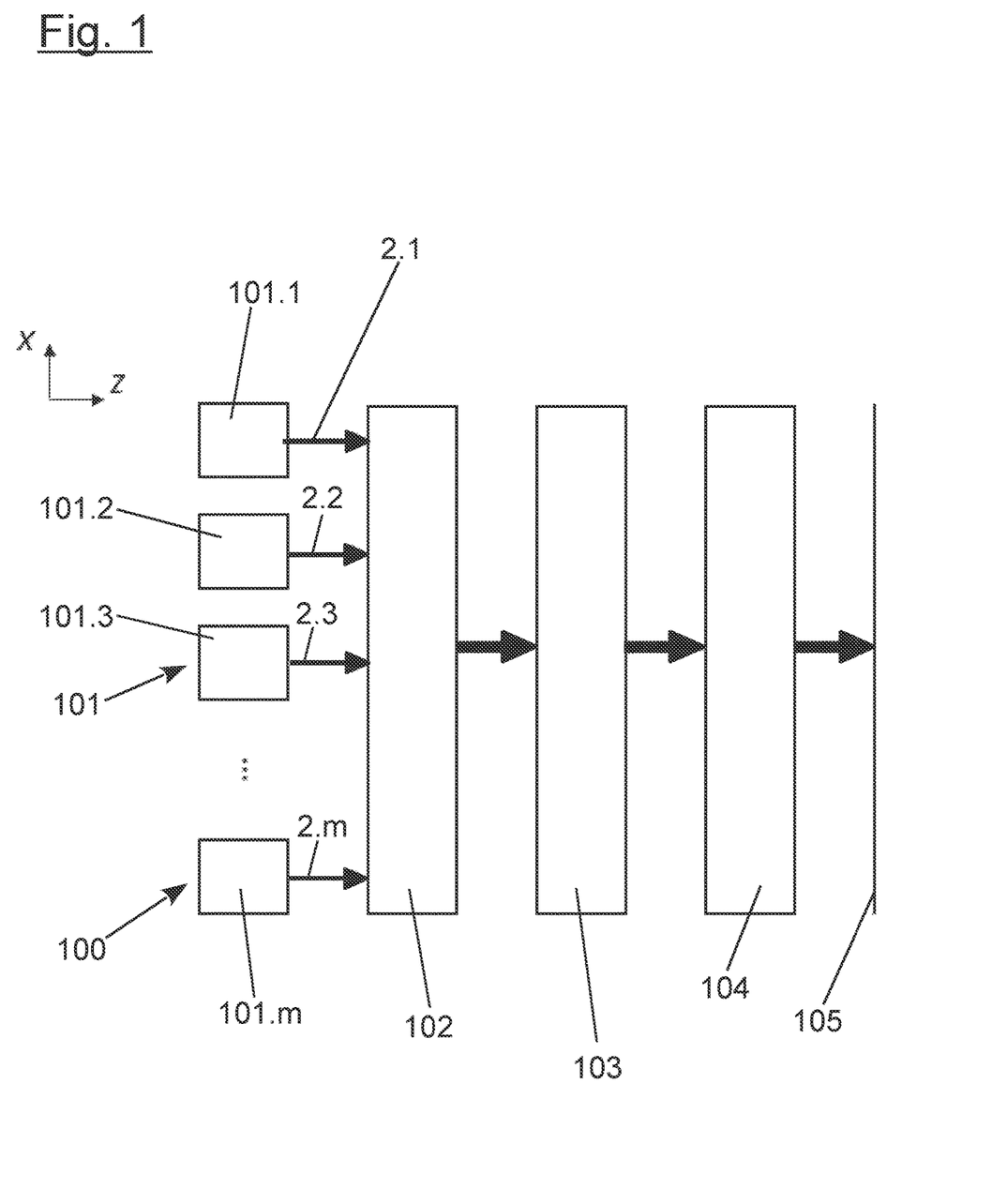
FIG. 1 a schematically very simplified representation of a laser device by means of which a line-shaped intensity distribution can be generated in a working plane, FIG. 2 a top view of an arrangement of two devices for homogenizing laser light in a first configuration, FIG. 3 a top view of an arrangement of two devices for homogenizing laser light in a second configuration, FIG. 4 a top view of a first of the two devices for homogenizing laser light according to FIGS. 2 and 3, FIG. 5 a detailed view showing the beam path of two partial beams of laser light through two spaced microlenses and an optical wedge, FIG. 6 a top view of an arrangement with a number m>2 of devices for homogenizing laser light.

FIG. 1 shows the structure of a corresponding laser device 100 in a schematically very simplified form and without explicitly depicting, for example, individual laser beams or details of the optical components of the laser device 100, in particular specific shapes of optically functional surfaces of the optical components.

Typically, the laser device 100 has a laser light source 101 with a plurality of laser modules 101.1, 101.2, . . . , 101.$m$ or laser emitters, wherein the laser light 2.1-2.$m$ emitted during operation by these laser modules 101.1, 101.2, . . . , 101.$m$ or laser emitters preferably has similar, but not necessarily identical beam profiles. The laser modules 101.1, 101.2, . . . , 101.$m$ or laser emitters of the laser light source 101 may illuminate during operation a beam transformation device 102, which comprises a plurality of optical means for beam shaping, which are designed to generate an intensity distribution which is line-shaped at least in sections. Such beam transformation devices 102 are known from the prior art in quite different embodiments and shall therefore not be further explained here.

After this beam shaping, the laser light 2.1-2.$m$ passes an arrangement 103 of a number m≥2 of devices 1.1-1.$m$ for homogenizing laser light 2.1-2.$m$, which will be explained in more detail below, and subsequently at least one optical Fourier device 104, especially one or more lenses, arranged in the beam propagation direction of the laser light 2.1-2.$m$. This Fourier lens 104 serves the purpose of generating a top-hat light intensity distribution in the spatial space for the first direction in a working plane 105 arranged behind the Fourier lens 104 in the beam propagation direction and in which a workpiece to be processed is located. The intensity distribution in the working plane 105 may be line-shaped after focusing in the second direction. The special feature here is that by using the arrangement 103 of a preferably even number m≥2 of devices 1.1-1.$m$ for homogenizing laser light 2.1-2.$m$, the length of the line and the flank shape of each individual line of laser light 2.1-2.$m$ can be adjusted in such a way that a line-shaped intensity distribution can be generated in the working plane 105 by superimposing the individual lines of laser light 2.1-2.$m$. The overlap of the partial lines of the laser light 2.1-2$m$ thus result in a homogeneous line-shaped intensity distribution in the working plane 105.

Figure 2:
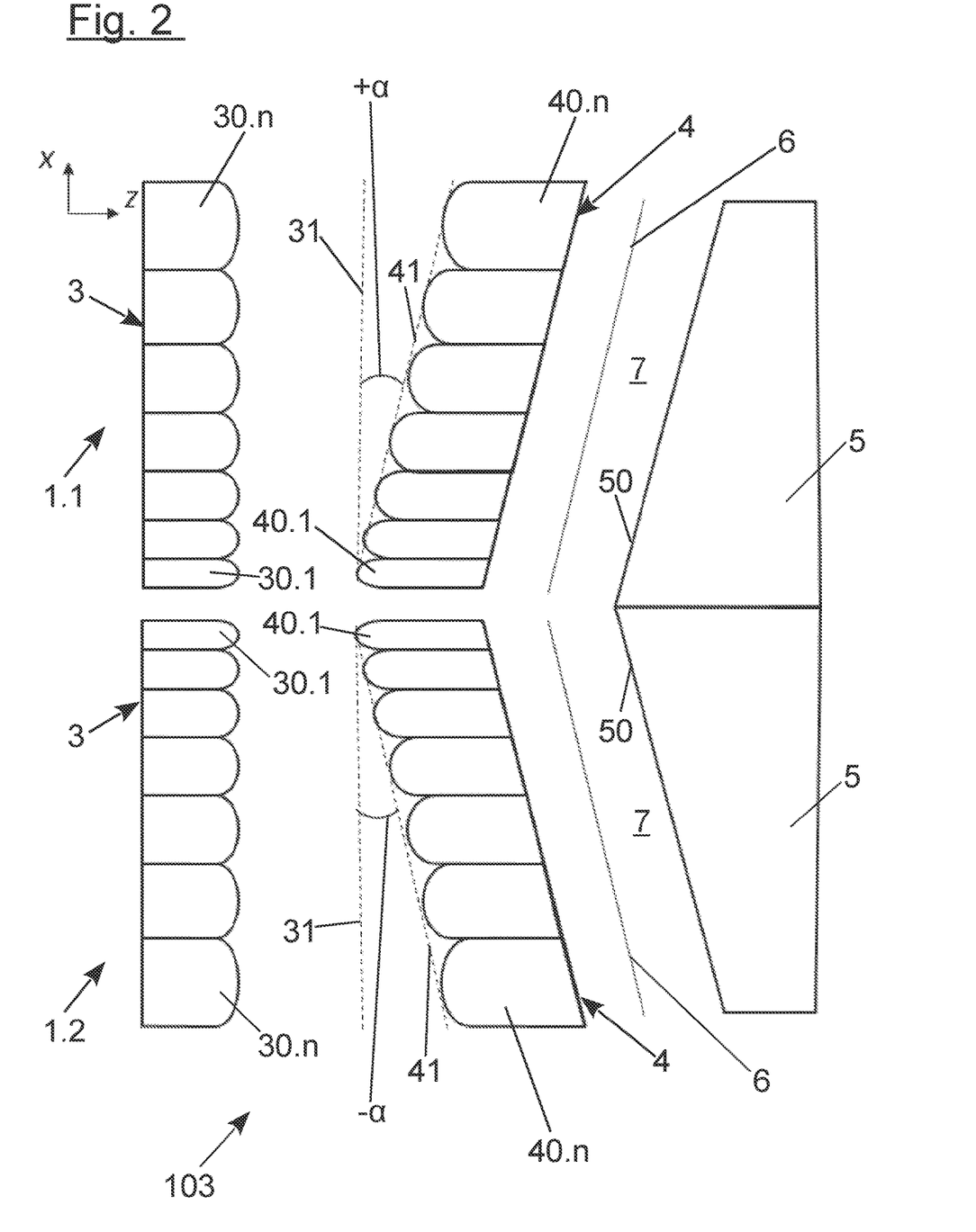
Figure 3:
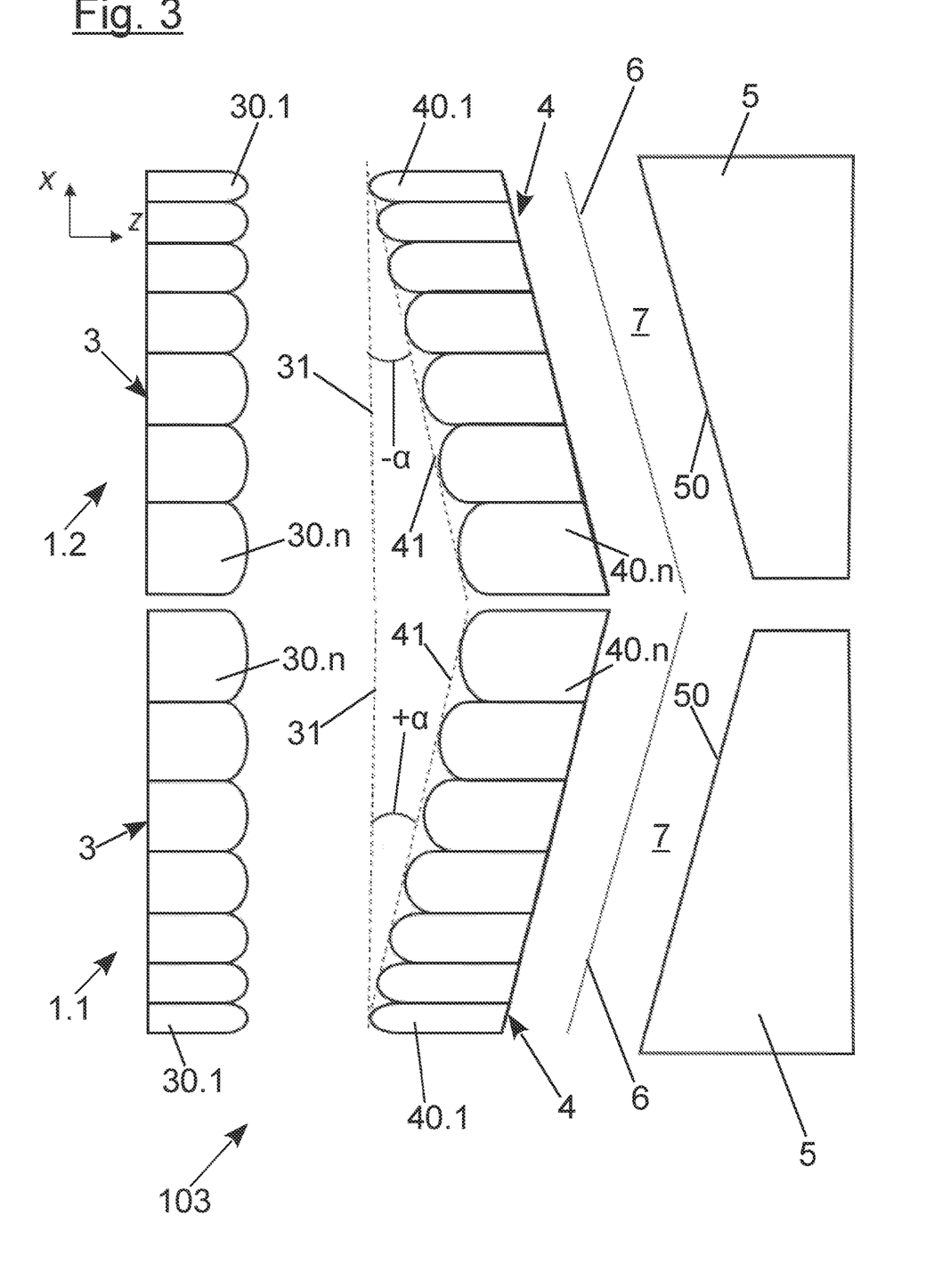
Figure 4:
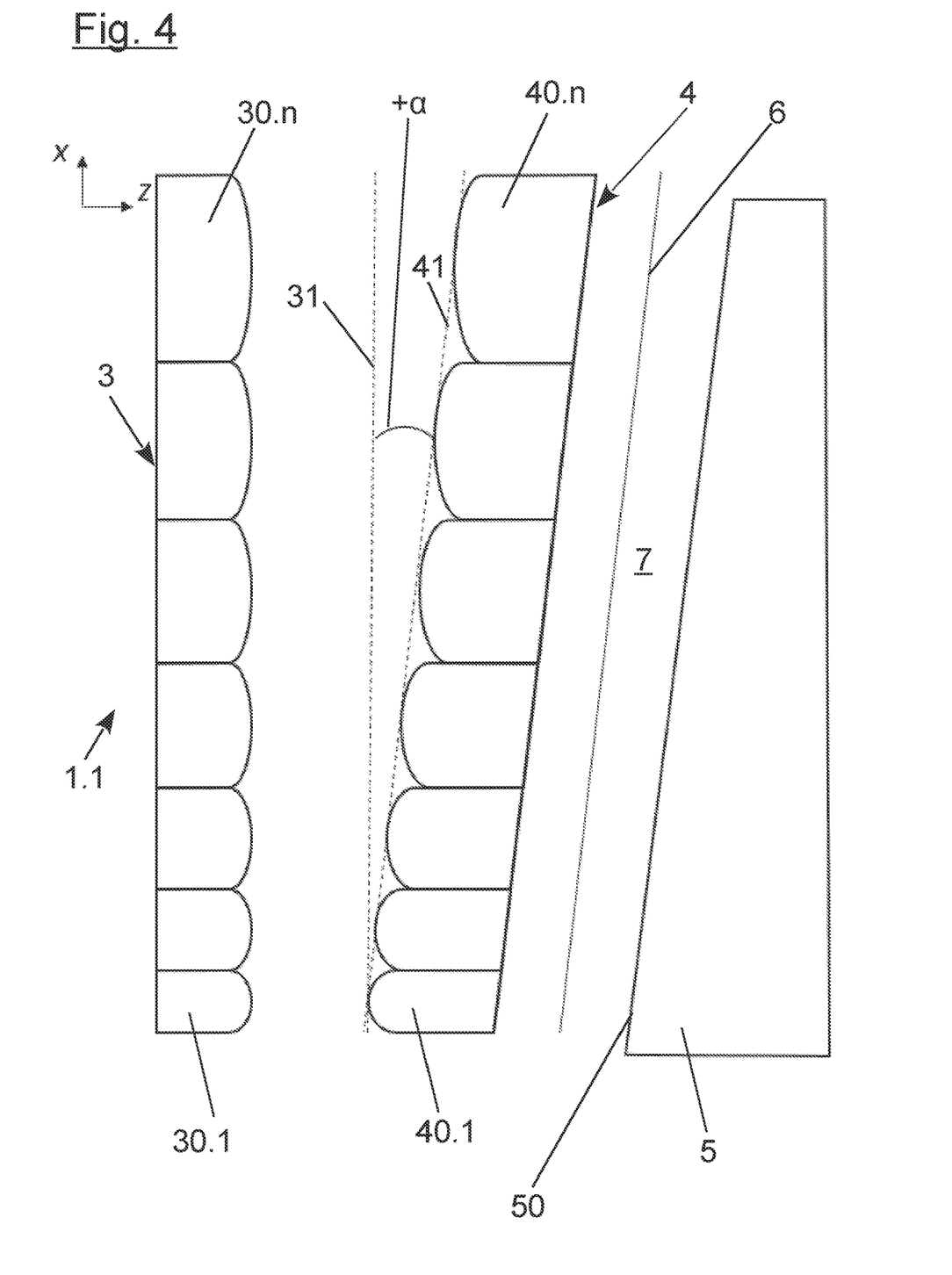
Figure 5:
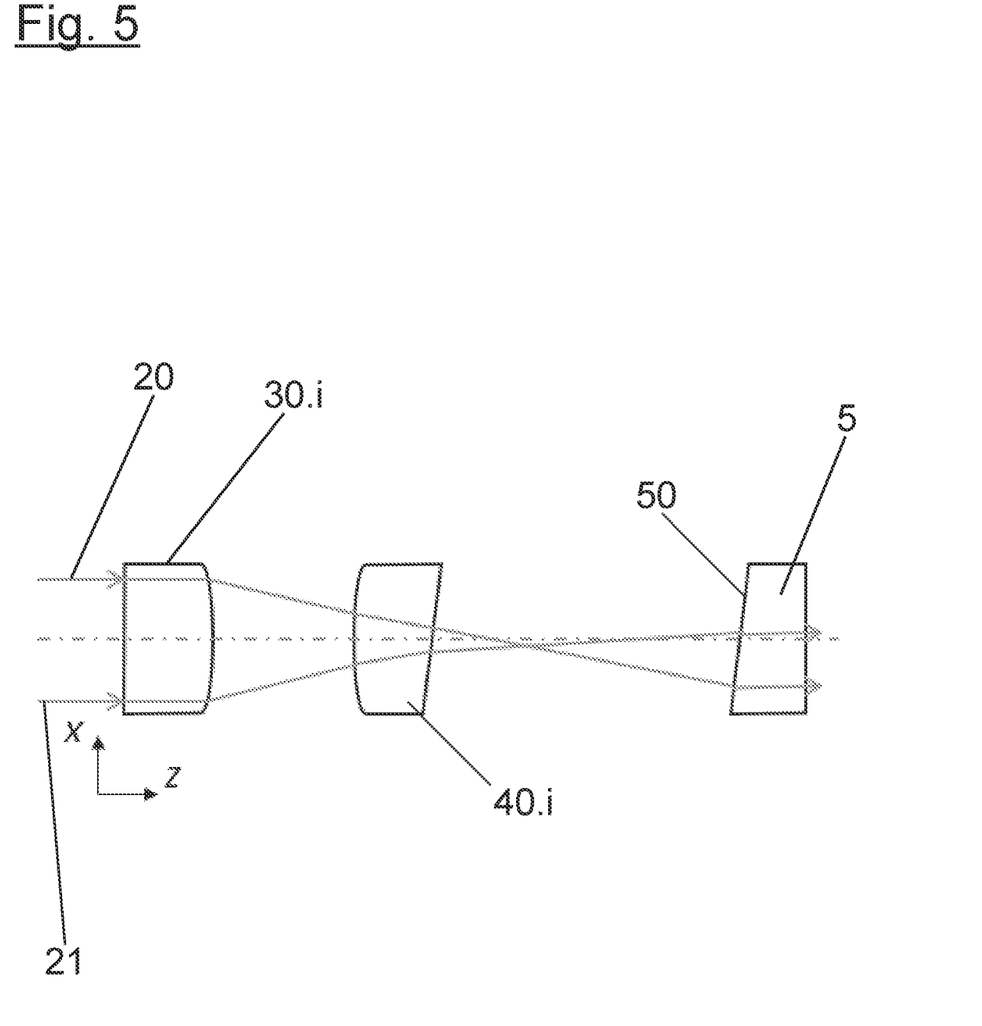

In the following, with reference to FIGS. 2 to 5, further details of an arrangement 103 of two devices 1.1, 1.2 for homogenizing laser light 2.1, 2.2 will be explained in more detail. In this context, FIGS. 2 and 3 show two different configurations of the two devices 1.1, 1.2 for homogenizing laser light 2.1, 2.2, which form the arrangement 103.

In general, the arrangement 103 may preferably have an even number m≥2 of such devices 1.1-1.$m$. As can be seen in FIGS. 2 and 3, the two devices 1.1, 1.2 arranged side by side in the x-direction are each configured to be mirror symmetrical with respect to a y-z plane extending between them. The two configurations shown there differ from each other in that the positions of the devices 1.1, 1.2 are interchanged.

Each of the two devices 1.1, 1.2 has a first microlens array 3 with a number n of microlenses 30.1-30.$n$ arranged side by side in a first direction (x-direction) and formed as cylindrical lenses with their cylindrical axes oriented substantially parallel to each other. Furthermore, each of the two devices 1.1, 1.2 has a second microlens array 4, which is arranged at a distance from the first microlens array 3 in the beam propagation direction of the laser light 2.1, 2.2 (z-direction) and comprises a number n of microlenses 40.1-40.$n$, which are also arranged next to one another in the first direction (x-direction) and are formed as cylindrical lenses whose cylinder axes are oriented substantially parallel to one another. The cylinder axes of the microlenses 30.1-30.$n$, 40.1-40.$n$, which are designed as cylinder lenses, each extend in a second direction (y-direction) perpendicular to the first direction (x-direction) and perpendicular to a third direction (z-direction), which defines the beam propagation direction of the laser light 2.1, 2.2.

The number n of microlenses 30.1-30.$n$ of the first microlens array 3 corresponds to the number n of microlenses 40.1-40.$n$ of the second microlens array 4. In other words, each of the microlenses 40.1-40.$n$ of the second microlens array 4 corresponds to a microlens 30.1-30.$n$ of the first microlens array 3 is associated, so that during operation of the devices 1.1, 1.2 partial beams 20, 21 of the laser light 2.1, 2.2 which have passed through an i-th microlens 30.$i$ (i=1 . . . n) of the first microlens array 3 pass at least for the most part through an i-th microlens 40.$i$ (i=1 . . . n) of the second microlens array 4. This situation is shown in detail in FIG. 5. In order to simplify the illustration, microlens arrays 3, 4 have been chosen for the description of the embodiments, consisting of n=7 of microlenses 30.1-30.n, 40.1-40.n. It is understood that this number is merely exemplary.

For example, in alternative embodiments, also a cylindrical or spherical microlenses 30.1-30.n, 40.1-40.n can be used, whereby in particular in the case of a spherical design, the complexity of the overall optical setup is further increased.

Furthermore, the two devices 1.1, 1.2 for homogenizing laser light 2.1, 2.2 each have an optical wedge 5 which is spaced from the second microlens array 4 and is thus arranged behind the second microlens array 4 in the beam propagation direction of the laser light 2.1, 2.2.

As can be seen in particular in FIGS. 2 and 3, the plane 41 of the lens vertices of the second microlens array 4 is inclined to the plane 31 of the lens vertices of the first microlens array 3 by an angle |α| in each case in both configurations shown there, so that the distances of the microlenses 30.1-30.n of the first microlens array 3 from the microlenses 40.1-40.n of the second microlens array 4 corresponding thereto vary. Thereby, in the first device 1.1, the plane 41 of the lens vertices of the second microlens array 4 is inclined to the plane 31 of the lens vertices of the first microlens array 3 by an angle +α in both configurations, and in the second device 1.2, the plane 41 of the lens vertices of the second microlens array 4 is oppositely inclined to the plane 31 of the lens vertices of the first microlens array 3 by an angle −α

The microlens arrays 3, 4 of the two devices 1.1, 1.2 for homogenizing laser light 2.1, 2.2 are designed such that the devices 1.1, 1.2 each have a focal plane 6 in an air gap 7 between the second microlens array 4 and the optical wedge 5. To this end, the microlens arrays 3, 4 in the embodiment examples shown here, are formed such that the focal lengths and diameters of the microlenses 30.1-30.n, 40.1-40.n, as viewed in the first direction (x-direction), successively increase starting from the first microlens 30.1, 40.1 to the nth microlens 30n, 40n. In general, the microlens arrays 3, 4 can be designed in such a way that the focal lengths and diameters of the microlenses 30.1-30.n, 40.1-40.n, as viewed in the first direction (x-direction), increase from the first microlens 30.1, 40.1 to the nth microlens 30n, 40n, so that an ascending or descending order of the microlenses 30.1-30.n, 40.1-40.n according to focal lengths or diameters in the first direction is not mandatory, although it is preferred, in particular for manufacturing reasons.

Due to the inclination of the plane 41 of the lens vertices of the second microlens array 4 to the plane 31 of the lens vertices of the first microlens array 3 by the angle |α|, the distance of the first microlens 30.1 (shortest focal length) of the first microlens array 3 from the first microlens 40.1 (shortest focal length) of the second microlens array 4 is respectively the minimum distance between the two microlens arrays 3, 4 of both devices 1.1, 1.2. In contrast, the distance of the nth microlens 30.n (largest focal length) of the first microlens array 3 from the nth microlens 40.n (largest focal length) of the second microlens array 4 is the maximum distance between the two microlens arrays 3, 4 of the devices 1.1, 1.2.

Due to the position of the focal plane 6 in the air gap 7 between the second microlens array 4 and the optical wedge 5, it is advantageously achieved that the energy density in the glass substrates of the optically functional components, in particular in the second microlens array 4 and in the optical wedge 5, and also on their surfaces can be considerably reduced. As a result, it is possible that the devices 1.1, 1.2 for homogenizing laser light 2.1, 2.2 presented here, or the arrangement 103 formed from them, can also be used for homogenizing laser light 2.1, 2.2 at high power without causing damage to the glass substrates and the surfaces of the optically functional components, in particular the second microlens array 4 and the optical wedge 5, of the devices 1.1, 1.2 or the arrangement 103 formed from them.

The optical wedge 5 has a light entrance surface 50 oriented parallel to the plane 41 of the lens vertices of the second microlens array 4 and thus also inclined by the angle |α|—that is, by the angle +α in the case of the first device 1.1 and by the angle −α in the case of the second device 1.2—with respect to the plane 31 of the lens vertices of the first microlens array 3. The optical wedge 5 can be used in an advantageous way for fine adjustment of the optical path length of the laser light 2.1, 2.2 and thus also for fine adjustment and compensation of possible micro-inhomogeneities. By this measure, the surface quality of the workpieces to be processed by means of the laser device 100 can be improved in an advantageous manner. The optical wedge 5 can be moved in the millisecond range for this purpose. Due to the fact that the devices 1.1, 1.2 for homogenization of laser light 2.1, 2.2 presented here are not monolithic, an adjustment of the light-field length in the working plane 105 as well as a compensation of decentering errors of the microlens arrays 3, 4 is also possible within certain limits.

The well-defined common focal plane 6 within the air gap 7 between the second microlens array 4 and the optical wedge 5, which is arranged at a distance dL behind the second microlens array 4, can be achieved by adjusting the radii of curvature or focal lengths of the microlenses 30.1-30.n of the first microlens array 3. Thereby, the focal length $f_1^{(i)}$ for the i-th of the total n microlenses 30.1-30.n of the first microlens array 3 can be calculated as follows:

$$f_1^{(i)} = -\frac{\left(f^{(i)}\right)^2}{\frac{d_G}{n_G} + d_L - f^{(i)}}$$

In this formula, $d_G$ denotes the glass thickness and $n_G$ denotes the refractive index of the glass substrate of the second microlens array 4. Furthermore, $f^{(i)}$ denotes the focal length of the i-th of the total n microlenses 40.1-40.n of the second microlens array 4, where $f_1^{(i)} > f^{(i)}$ is always valid. Preferably $$\frac{d_G}{n_G} + d_L < f^{(i)}$$

As mentioned above, the optical wedge 5, which is arranged behind the second microlens array 4 in the beam propagation direction, has a light entrance surface 50, which is arranged parallel to the plane 41 of the lens vertices of the second microlens array 4 and is thus also inclined by the angle |α| to the plane 31 of the lens vertices of the first microlens array 3. In this way, phase differences of individual partial beams of the laser light 2.1, 2.2 can be ensured in an advantageous manner in order to minimize micro-inhomogeneities caused by light interference. In addition, with the aid of the optical wedge 5, an angular offset imposed by the second microlens array 4 can be corrected in a simple manner.

The inclination angle α should advantageously fulfill the following criterion:

$$\frac{\beta}{2} < \arcsin\left[n_G \sin\left\{\alpha - \arcsin\left(\sin\frac{|\alpha|}{n_G}\right)\right\}\right]$$

Here β denotes the numerical aperture of the second microlens array 4, which is the same for all microlenses 40.1-40.$n$. The thickness of the optical wedge 5 at its thinnest point can in principle be chosen arbitrarily. Preferably, |α| should be <15°, since imaging errors may occur at larger angles, which would have to be compensated in a suitable manner by additional measures.

The distances $d_{12}^{(i+1)}$ of the two microlens arrays 3, 4, which are typically in the micrometer and millimeter range, respectively, can be determined by a recursive relation for which holds:

$$d_{12}^{(i+1)} = \frac{2\left(f^{(i)} + \frac{p^{(i)}}{2}\tan(\alpha)\right)}{\beta\left(\frac{2f^{(i)}}{p^{(i)}} - \tan(\alpha)\right)}$$

In this formula, $p^{(i)}$ denotes the center-to-center distance between the i-th microlens 40.$i$ and the i+1-th microlens 40.$i$+1 (i=1 . . . n−1) of the second microlens array 4.

The arrangement 103 preferably has an even number m≥2 of the devices 1.1-1.$m$ presented herein. The arrangements 103 shown in FIGS. 2 and 3 exemplarily have two such devices 1.1, 1.2, which are formed mirrored-symmetrically to the y-z plane extending between them. In the present case, this means for the first configuration according to FIG. 2 that the first microlens 30.1 of the first microlens array 3 of the first device 1$a$ is arranged adjacent to the first microlens 30.1 of the first microlens array 3 of the second device 1$b$. For the second configuration shown in FIG. 3, in which the positions of the two devices 1.1, 1.2 are reversed compared to the configuration shown in FIG. 2, the result is that the nth microlens 30.$n$ of the first microlens array 3 of the first device 1$a$ is arranged adjacent to the nth microlens 30.$n$ of the first microlens array 3 of the second device 1$b$. The same applies to the microlenses 40.1-40.$n$ of the second microlens array 4 in both configurations.

An arrangement 103 carried out in the manner described here leads to a superposition of the two for example linear-shaped intensity profiles of the laser light 2.1, 2.2 in the working plane 105, which have the same slope of variation of the intensity distribution along the line, but with opposite slope signs. Thus, linear macro-inhomogeneities can be compensated so that the resulting intensity profile in the working plane 105 is well homogenized.

Figure 6:
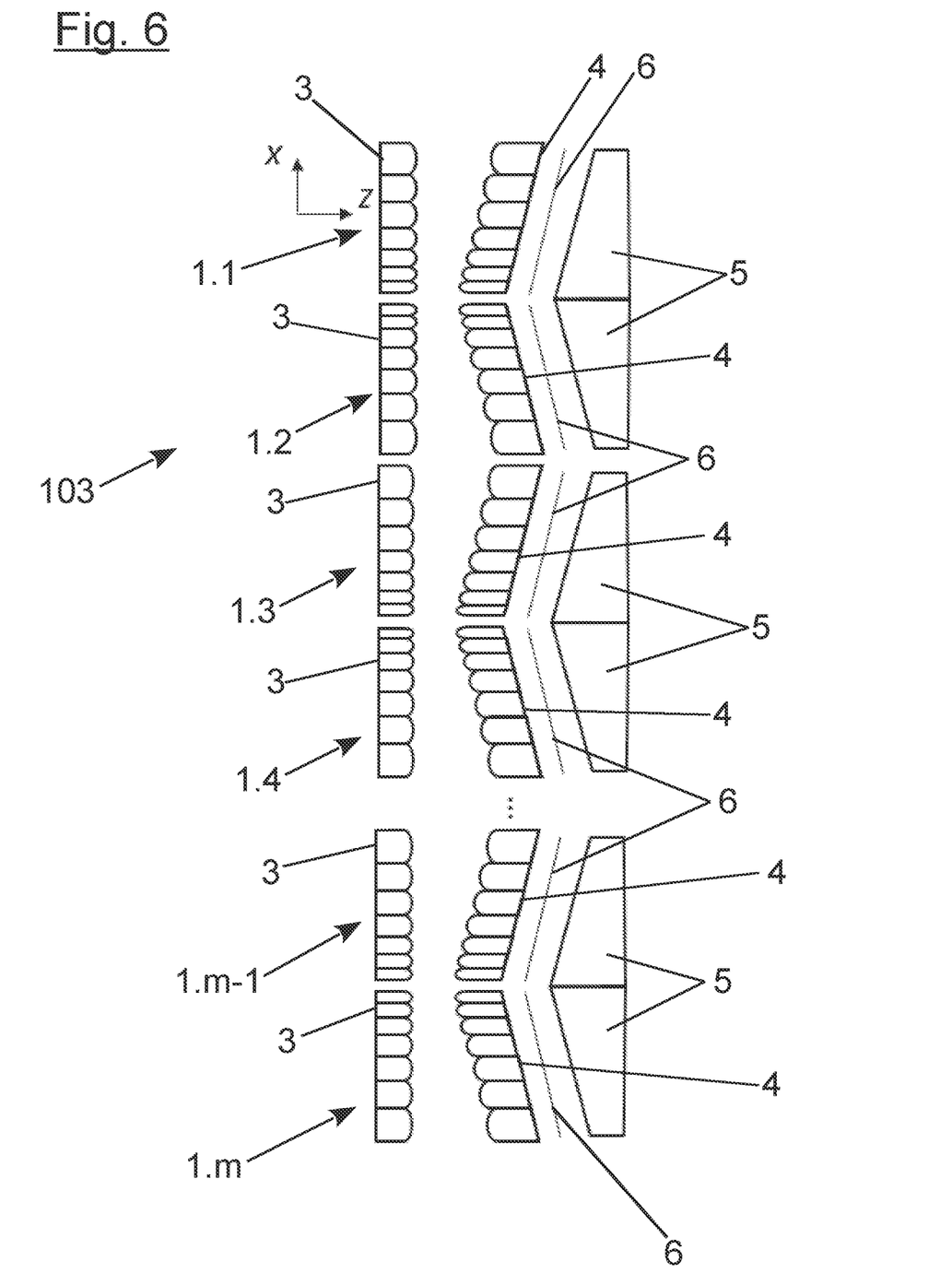

If the arrangement 103 has an even number m>2 of such devices 1.1-1.$m$, they are lined up in the manner illustrated in FIG. 6, always maintaining the mirror symmetry of adjacent devices 1.1-1.$m$ through which the laser light 2.1, 2.2 . . . , 2$m$ can pass. This means that mutually adjacent devices 1.1-1.$m$ are formed in such a way that the plane 41 of the lens vertices of the second microlens array 4 is inclined to the plane 31 of the lens vertices of the first microlens array 3 alternately by an angle +α and by an angle −α.

The cancellation of macro inhomogeneities can alternatively be achieved by prehomogenization of the laser light 2.1-2.$m$, since the sampling effect no longer makes a significant contribution when the devices 1.1-1.$m$ are homogeneously illuminated. Then, for example, only one of the devices 1.1-1.$m$ or an odd number of devices 1.1-1.$m$ could be used for homogenization of the laser light 2.1-2.$m$.

Furthermore, it is possible that cancellation of the macro-inhomogeneities is achieved by an asymmetric adjustment of, for example an initially Gaussian laser beam profile. For this, the asymmetry of the beam profile must be adapted to the width modulation of the microlenses 30.1-30.$n$, 40.1-40.$n$ of the microlens arrays 3, 4, which is accompanied by the array inclination angle α.

Processing of workpieces, which are typically carried out with laser devices 100 having such devices 1.1-1.$m$ for homogenization of laser light 2.1-2.$m$ or an array 103 of an even number m≥2 of such devices 1.1-1.$m$, are very sensitive with respect to even small spatial intensity variations in the intensity profile in the plane 105. Therefore the suppression of interference-induced spatial intensity variations is also advantageous. Although it may be not possible to suppress these completely even with the devices 1.1-1.$m$ for homogenization of laser light 2.1-2.$m$ presented here or with the arrangement 103 formed from them, they occur will only in a strongly attenuated form.

In order to further improve the optical properties of the laser light 2.1-2.$m$ in the working plane 105, the optical wedge 5 can be rotated about the y-axis during the machining process. This creates the possibility of imposing a time-dependent angular offset on the resulting linear intensity distribution, so that the laser line formed in the working plane 105 can be moved back and forth, for example in the millisecond range, causing the periodic pattern on the workpiece to be machined to lose contrast. Moreover, by varying the distance of the second microlens array 4 from the first microlens array 3, the line length in the working plane 105 can be varied within a certain range.

The invention claimed is:

1. A device for homogenizing laser light, comprising:
   a first microlens array having a plurality of microlenses arranged side by side in a first direction,
   a second microlens array comprising a plurality of microlenses arranged side by side in the first direction;
   wherein the second microlens array is spaced apart from the first microlens array in the beam propagation direction of the laser light, and the plane of the lens vertices of the second microlens array is inclined at an angle |α| to the plane of the lens vertices of the first microlens array; and
   wherein the microlens arrays are formed such that the focal lengths of the microlenses arranged side by side in the first direction vary from the first microlens to the nth microlens,
   wherein an optical wedge is arranged behind the second microlens array in the beam propagation direction and the focal lengths of the microlenses of the microlens arrays are selected such that a focal plane of a combination consisting of the first microlens array and second microlens array lies in a gap between the second microlens array and the optical wedge.

2. The device according to claim 1, wherein the microlens arrays are formed in such a way that the focal lengths of the microlenses arranged side by side in the first direction successively increase starting from the first microlens up to the nth microlens.

3. The device according to claim 1, wherein the number of microlenses of the first microlens array corresponds to the number of microlenses of the second microlens array, so that each of the microlenses of the second microlens array is associated with a microlens of the first microlens array.

4. The device according to claim 1, wherein the microlenses are formed as cylindrical lenses whose cylindrical axes are each oriented in a second direction perpendicular to the first direction and perpendicular to a third direction defining the beam propagation direction of the laser light.

5. The device according to claim 1, wherein the optical wedge has a light entrance surface oriented parallel to the plane of the lens vertices of the second microlens array.

6. The device according to claim 1, wherein the focal length $f_1^{(i)}$ of the i-th microlens of the first microlens array is valid:

$$f_1^{(i)} = -\frac{(f^{(i)})^2}{\frac{d_G}{n_G} + d_L - f^{(i)}}$$

where $d_G$ denotes the glass thickness and $n_G$ denotes the refractive index of a glass substrate of the second microlens array, and where $f^{(i)}$ denotes the focal length of the i-th microlens of the second microlens array, and where $d_L$ is the distance between the second microlens array and the optical wedge, and where i=1 ... n.

7. The device according to claim 1, wherein the distances $d_{12}^{(i+1)}$ between the microlenses of the first microlens array and the microlenses of the second microlens array are:

$$d_{12}^{(i+1)} = \frac{2\left(f^{(i)} + \frac{p^{(i)}}{2}\tan(\alpha)\right)}{\beta\left(\frac{2f^{(i)}}{p^{(i)}} - \tan(\alpha)\right)}$$

where $p^{(i)}$ denotes the center-to-center distance between the i-th microlens and the i+1-th microlens and $f^{(i)}$ denotes the focal length of the i-th microlens and B denotes the numerical aperture of the second microlens array, where i=1 ... n−1.

8. The device according to claim 1, wherein the angle of inclination a is selected such that:

$$\frac{\beta}{2} < \arcsin\left[n_G \sin\left\{\alpha - \arcsin\left(\sin\frac{[\alpha]}{n_G}\right)\right\}\right]$$

where β denotes the numerical aperture and $n_G$ the refractive index of the second microlens array.

9. The device according to claim 1, wherein the optical wedge is translationally movable along and/or rotatable about an axis extending in a second direction perpendicular to the first direction and perpendicular to a third direction defining the beam propagation direction of the laser light.

10. An arrangement of a plurality of devices for homogenizing laser light according to claim 1, wherein the devices are arranged adjacent to one another in the first direction and wherein devices are formed such that the plane of the lens vertices of the second microlens array is inclined to the plane of the lens vertices of the first microlens array alternately by an angle +α and by an angle −α.

11. The arrangement according to claim 10, wherein an even number of devices is arranged side by side.

\* \* \* \* \*